United States Patent
Mees et al.

(10) Patent No.: US 7,462,282 B2
(45) Date of Patent: Dec. 9, 2008

(54) FILTER ELEMENT AND METHOD FOR THE PRODUCTION THEREOF

(75) Inventors: Harald Mees, Lebach (DE); Michael Sakraschinsky, St. Ingbert (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 543 days.

(21) Appl. No.: 10/522,682

(22) PCT Filed: Jul. 26, 2003

(86) PCT No.: PCT/EP03/08271

§ 371 (c)(1),
(2), (4) Date: Jan. 31, 2005

(87) PCT Pub. No.: WO2004/014516

PCT Pub. Date: Feb. 19, 2004

(65) Prior Publication Data

US 2005/0284807 A1    Dec. 29, 2005

(30) Foreign Application Priority Data

Aug. 2, 2002  (DE) ................. 102 35 275

(51) Int. Cl.
*B01D 29/00* (2006.01)
*B01D 35/00* (2006.01)

(52) U.S. Cl. ................... 210/493.1; 210/232; 210/483; 210/484; 210/485; 210/493.5; 210/497.01

(58) Field of Classification Search ............... 210/483, 210/484, 485, 493.1, 493.4, 493.5, 497.01, 210/503, 232

See application file for complete search history.

(56) References Cited

U.S. PATENT DOCUMENTS

| | | | |
|---|---|---|---|
| 4,735,720 A | 4/1988 | Kersting | |
| 5,622,624 A | 4/1997 | Lauer et al. | |
| 5,736,045 A * | 4/1998 | Bies et al. | 210/497.01 |
| 6,368,506 B1 | 4/2002 | Gebert et al. | |
| 6,863,758 B1 * | 3/2005 | Altmeyer et al. | 156/91 |
| 6,949,155 B1 * | 9/2005 | Lang et al. | 156/73.1 |

FOREIGN PATENT DOCUMENTS

| | | |
|---|---|---|
| DE | 81 21 211.9 | 1/1983 |
| DE | 43 12 705 A1 | 10/1994 |
| WO | WO 01/21279 A1 | 3/2001 |

* cited by examiner

*Primary Examiner*—John Kim
(74) *Attorney, Agent, or Firm*—Roylance, Abrams, Berdo & Goodman, L.L.P.

(57) ABSTRACT

A filter element includes a filter cylinder whose outer side rests against a fluid-permeable supporting tube (15). The inside (3) of the filter cylinder can be flown through by the fluid to be filtered. The filter cylinder is formed by a filter mat web. The filter mat web has a series of folds (9) that rest against one another at least in areas. Both ends of the filter mat web are joined to one another at a junction (5) to form an annular body (1). The filter element includes a device that acts upon the junction (5) to prevent, in the area of the junction (5), a bulging of the folds (9) caused by the flow of the fluid.

10 Claims, 4 Drawing Sheets

ND METHOD FOR THE
FILTER ELEMENT AND METHOD FOR THE PRODUCTION THEREOF

REFERENCE TO RELATED APPLICATION

This application is related to U.S. patent application Ser. No. 12/155,173 filed May 30, 2008 and entitled "Method for the Production of a Filter Element".

FIELD OF THE INVENTION

The present invention relates to a filter element having a filter cylinder adjoining on its exterior a fluid-permeable support tube through which fluid to be filtered may flow. The filter cylinder is made up of a filter mat web having a sequence of folds adjacent to each other at least in individual areas. The two ends of the filter mat web are joined to each other at a connecting point to form an annular element. The present invention also relates to a method for the production of such a filter element.

BACKGROUND OF THE INVENTION

Filter elements of this type are available on the market and are widely used, for example, in hydraulic assemblies in branches of a system through which hydraulic fluids flow. The known filter elements are not entirely satisfactory with respect to their safety in operation and the beta value stability of decisive importance for filter output. With high fluid outputs in particular, the danger exists that deformation or damage may occur at the junction point at which the ends of the filter mat web are joined to form the annular element forming the filter cylinder as a result of the differential pressure of the fluid acting on the junction point. Such damage and/or deformation of the folds in the area of the junction point are here identified by the common expression "fold bulging".

SUMMARY OF THE INVENTION

An object of the present invention is to provide a filter element having improved operating safety and beta value stability compared to conventional filter elements, even with high flow output.

In the case of one such filter element, this object is basically attained by a configuration at the junction point acting to prevent a bulging of the folds in the area of the junction point caused by the action of fluid flow.

According to the present invention, special protective measures are taken at the point of junction of the filter mat web, which measures prevent bulging of the folds in this area. The desired improvement in operating safety is achieved even in the event of high flow output and correspondingly high fluid differential pressures in the area of the junction point.

In one preferred exemplary embodiment, the configuration preventing bulging in the area of the junction point is formed in that the folds of the filter mat web are joined to each other along those end edges. The end edges face the interior of the annular element to be formed, so that both folds adjacent to each other at the junction point have their tops positioned on the exterior on the annular element and facing the support tube. The junction point, that is, the fusion seam or area of adhesion by which the annular element forming the filter cylinder is closed, is positioned in the interior on the filter cylinder. Such junction point rests on both sides on the support tube by the adjacent folds, the tops of which are positioned on the exterior on the annular element. In this configuration, the junction point forms no point weak in resisting the active forces resulting from the differential pressure applied in operation.

By preferences, the filter mat web is in the form of a flexible mat structure of metal-free plastic-supported filter mats. The connection of the ends of the filter mat web to form a closed annular structure is effected by a fusion seam. To make simple and efficient production possible, the fusing process must be carried out on the exterior of the annular element. The junction point is positioned on the exterior of the filter cylinder so that, as stated earlier, the fusion seam would form a weak point of the filter cylinder during operation.

To make allowance for this factor, provision is made by the present invention for an especially advantageous exemplary embodiment such that the dimensions determined for the flexible filter mat web are such that the annular element may be reversed after formation of an exterior fusion seam. After reversal, the fusion seam is positioned on the interior on the reversed annular element now ready for use.

Despite the simplicity of the production method, that is, formation of a fusion seam on the exterior, the annular element forming the filter cylinder after reversal is protected as desired from bulges in the area of the fusion seam now positioned in the interior.

In place of the protection from bulges resulting from the positioning of the junction point in the interior, or in addition to this protection, the configuration preventing bulging may have in the area of the junction point a retaining device. The retaining device has retaining elements which overlap the folds of the annular element adjoining the junction point on both sides, on the side of the folds facing away from the junction point. Especially secure support of the folds in the area of the junction point is thereby ensured.

The retaining elements of the retaining device may be in the form of a retaining projections formed on the inside of the support tube and projecting radially inward.

As an alternative, the retaining elements may be in the form of legs of a clamping element, U-shaped in cross-section. The legs may be inserted onto the folds adjacent to the junction point of the annular element.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Reference is initially made to FIGS. 1 to 5 illustrating a first exemplary embodiment of the filter element of the present invention, the conventionally configured support tube not being shown in these figures. When the filter cylinder or annular element is in the finished state, it is enclosed in this support tube. While in the form shown in FIGS. 2 and 3, it is introduced into the support tube (not shown). During operation, fluid to be filtered flows from the interior of the annular element in FIGS. 2 and 3; that is, the clean side of the filter device (not shown) having the filter element of the present invention is situated on the exterior of the support tube enclosing the annular element 1.

As shown in the figures, the annular element 1 is in the form of a folded filter mat web joined at its two ends to form a closed ring. The junction point is configured as a fusion seam 5. In the exemplary embodiments described, the filter mat web is in the form of a flexible mat structure possessing resilient properties, more precisely metal-free plastic-supported filter mats which may be fused together by a fusion seam 5 extending longitudinally to produce the annular element 1.

By preference, a six-layer structure of the filter mat web is provided having the following layers in sequence: an exterior support, a protective nonwoven layer, a prefilter layer, a main filter layer, a nonwoven support layer, and an interior support. A polyamide grid or a polyester fabric may be considered for the exterior support. A polyester material may be provided as the protective nonwoven layer. A glass fiber material, preferably in reduced form with respect to thickness and base weight, or a meltblown material may be considered for the filter layer. The main filter layer may analogously be a glass fiber material, which optionally is impregnated, or a meltblown material. A polyester or polyamide material may in turn be used as the support nonwoven layer, which may also be represented by a viscose nonwoven material or a polyamide with meltblown material. The interior support may, like the exterior support, be configured as a grid or fabric based on a polyamide or polyester basis.

Figure 2:
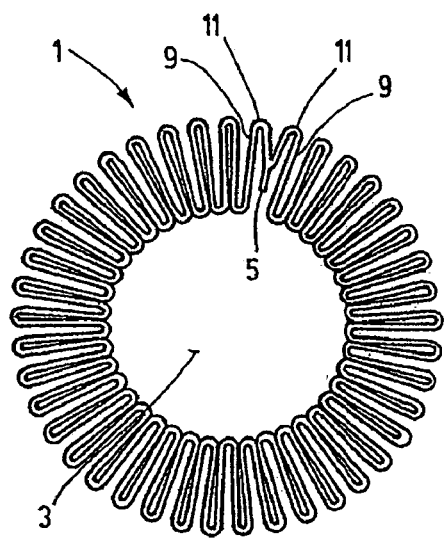
FIG. 2 is a top plan view similar to that of FIG. 1, showing the annular element forming the filter cylinder in the finished state, that is, with the fusion seam positioned on the interior after reversal.
Figure 1:
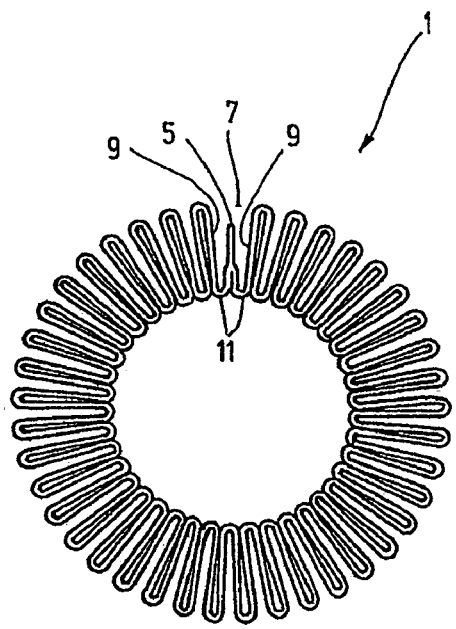
FIG. 1 is a top plan view of an annular element for a filter element according to a first embodiment of the present invention, in the partly completed state, with a fusion seam formed on the annular element from the exterior being positioned on the exterior.
Figure 3:
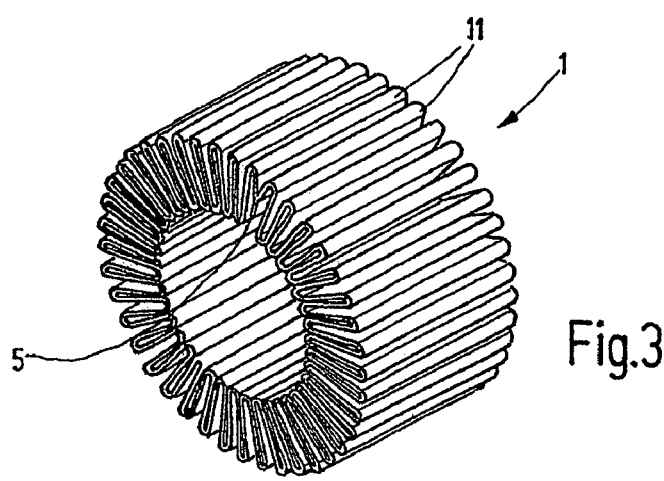
FIG. 3 is a perspective view of the annular element of FIG. 2.

As is shown by comparison of FIGS. 1 to 4, fusion seam 5 is displaced from the exterior in the partially formed, initial state of FIG. 1 to the interior in the finished state of FIGS. 2 and 3 by reversal of the annular element 1. The fusion seam 5 is positioned on the exterior in the form of a lengthwise seam made on the outside. While in the state shown in FIG. 1, with fusion seam 5 positioned on the exterior, on the outer edge of the annular element 1, a gap 7 exists in the area where there is no contact between the tops 11 of the folds 9 immediately adjacent to the fusion seam 5 on both sides and the enclosing support tube (not shown). In the state shown in FIGS. 2 and 3, the tops 11 of the folds 9 immediately adjacent to the fusion seam 5 are positioned on the outside (see FIG. 2), and accordingly are positioned adjacent on the support tube. Each fold has two radial members connected by and extending radially inwardly from a crown adjacent the support tube.

While in the case of the state shown in FIG. 1 at the differential pressure prevailing during operation, the danger exists of bulging in the area of the fusion seam 5, which may be moved radially outward by pressure forces. Tensile forces are active on the fusion seam 5, and tend to tear the seam open. In the case of the reversed state illustrated in FIGS. 2 and 3, bulging is not possible as a result of radial movement of the fusion seam 5, since the adjacent fold top 11 is supported. Also, the fusion seam 5 is not subjected to load in the form of forces of pressure tending to effect separation.

Figure 4:
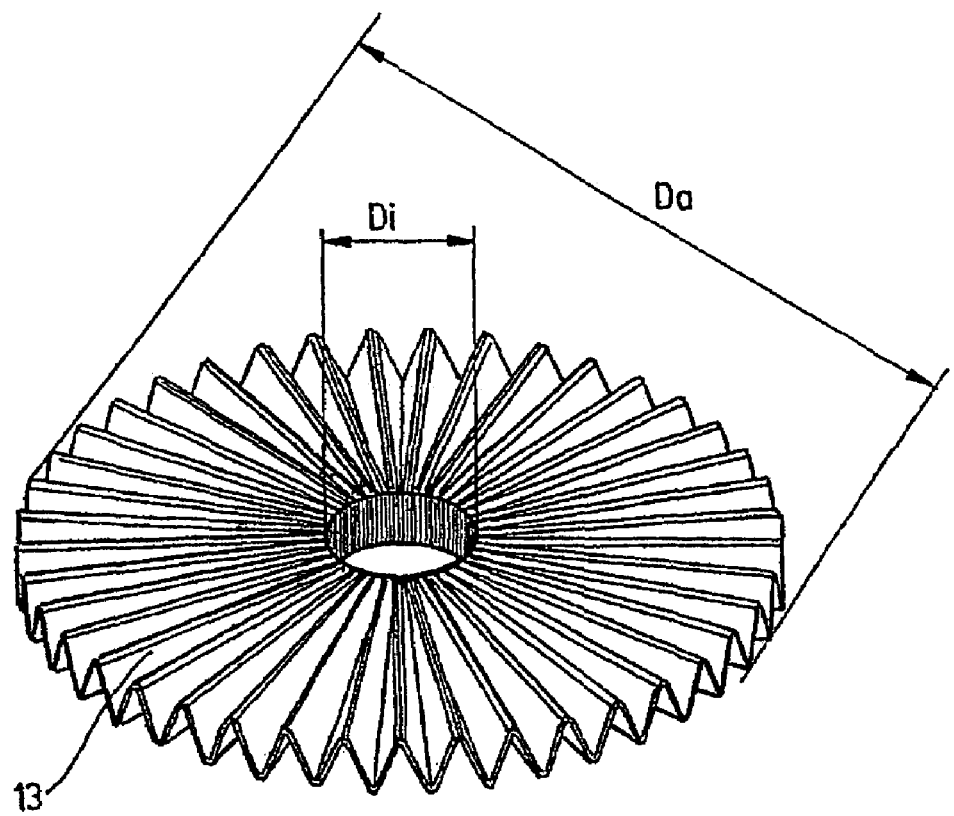
FIG. 4 is a perspective view of the filter disk formed in the course of reversal of the annular element shown in FIG. 1.
Figure 5:
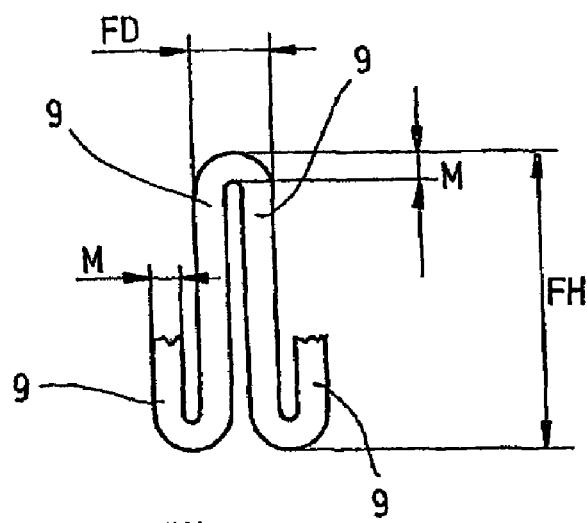
FIG. 5 is a partial, greatly enlarged, top plan view of a fold section of the annular element of FIGS. 1 and 2, along with data indicating the dimensions.

FIGS. 4 and 5 serve to illustrate the configuration and determination of the dimensions of the filter mat web forming the annular element 1, that is, a configuration which permits reversal of the annular element. The maximum length of the annular element permitting reversal, if it is in the form of a flexible fold structure, depends on the number of folds, the height of the folds, the strength of the mat structure, and the thickness of the folds of the annular element. FIG. 4 illustrates the exterior and interior diameters of the disk element 13 which are temporarily obtained in the course of reversal of the annular element 1. FIG. 5 illustrates determination of the dimensions of the folds 9 with respect both to strength of the material and to the fold size.

The maximum length of the annular element may be determined as follows on the basis of the parameters shown in FIGS. 4 and 5:

$F_{ANZ}$=number of folds
$F_H$=height of fold
$F_D$=thickness of fold
M=strength of material of mat structure
$L_M$=extended length of filter web
$L_{Mmax}$=maximum extended length of filter web
$D_{amax}$=maximum external diameter of filter disk
$D_i$=internal diameter of filter disk
$L_{max}$=maximum length of filter cylinder $$L_M = 2^* F_{Anz} * \left(F_H - 2^* M + \frac{\pi^* M}{2}\right) \quad 1)$$

$$D_{a_{max}} = D_i + 2^* L_{max} \quad 2)$$

$$L_{max} = \frac{D_{a_{max}} - D_i}{2} \quad 3)$$

$$D_{i2} = \frac{F_{Anz} * F_D}{\pi} \quad 4)$$

$$L_{M_{max}} = D_{a_{max}} * \pi \quad 5)$$

$$D_{a_{max}} = \frac{L_{M_{max}}}{\pi} \quad 6)$$

$$D_{a_{max}} = D_i + 2 * L_{max} \quad 7)$$

$$L_{max} = \frac{D_{a_{max}} - D_i}{2} \quad 8)$$

$$L_{max} = \frac{\frac{L_{M_{max}}}{\pi} - D_i}{2} \quad 8)\ \text{with value of 6)} \quad 9)$$

$$L_{max} = \frac{L_{M_{max}} - F_{Anz} * F_D}{2 * \pi} \quad 9)\ \text{with value of 4)} \quad 10)$$

$$L_{max} = \frac{F_{Anz} * \left(F_H - 2 * M + \frac{\pi * M}{2} - \frac{F_D}{2}\right)}{\pi} \quad 10)\ \text{with value of 1)} \quad 11)$$

Figure 6:
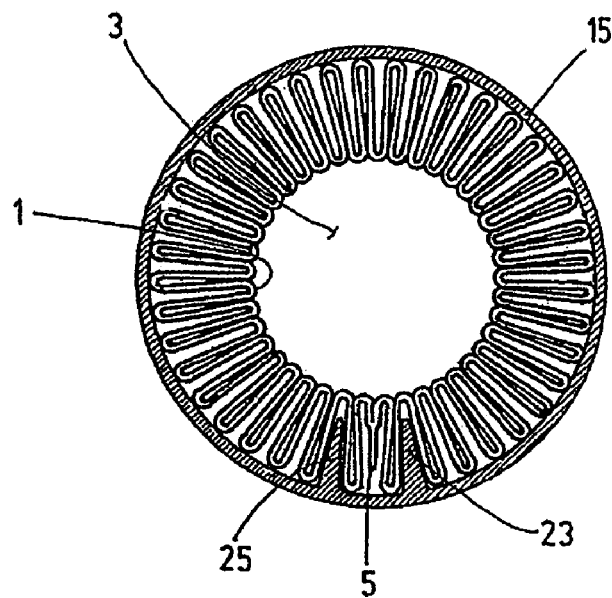
FIG. 6 is a top plan view in section of a filter element according to a second embodiment of the present invention.
Figure 7:
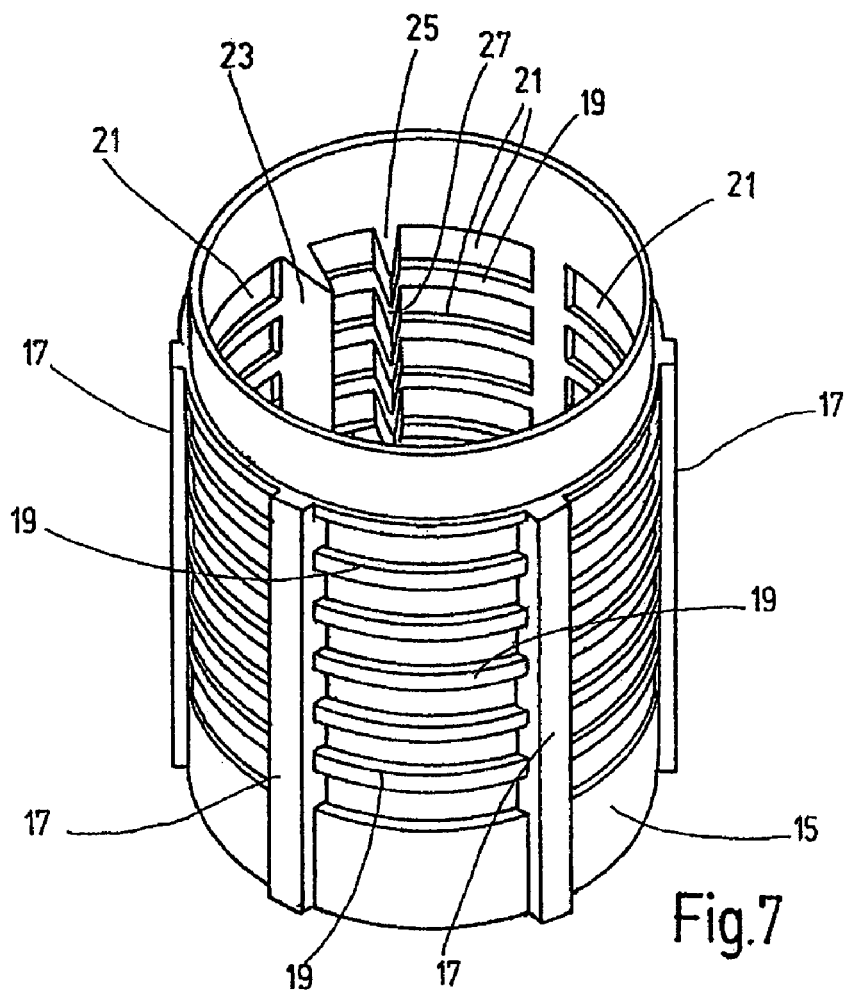
FIG. 7 is a perspective view of the support tube of the second exemplary embodiment shown in FIG. 6, without the filter cylinder present in this support tube, and FIG. 8 a perspective, exploded view of a filter element according to a third exemplary embodiment of the present invention.

FIGS. 6 and 7 illustrate a second exemplary embodiment of the filter element according to the present invention. Unlike the preceding example, the support tube 15 enclosing the filter cylinder is shown. This support tube 15 is shown separately in FIG. 7, that is, without the filter cylinder inserted. As is clearly shown in FIG. 7, the support tube 15, which is of transfer-molded plastic, has on its exterior adjoining the clean side strips 17 extending longitudinally connected by webs 19 forming annular elements between which are aperture 21 as fluid passages. As shown in FIG. 6, when a filter cylinder is inserted into the support tube 15, the area adjacent to the fusion seam 5 on both sides is secured by a retaining device having retaining projections 23 and 25. Projections 23 and 25 overlap the folds of the annular element adjacent to the fusion seam on both sides of the seam on the outer sides of the folds facing away or remote from the fusion seam 5 (see FIG. 6).

As shown in FIG. 7 in particular, the retaining projections 23 and 25 are integrally molded on the inside of the support tube 15. Retaining projection 23 is configured to extend along and through a strip 17 of the support element. Divided retaining projections 25 are provided on the other side. Between projections 25 are interstices 27 corresponding to the apertures 21 forming the fluid passages. The enclosure of the area of the fusion seam 5 formed by the retaining projections 23 and 25 effectively protects annular element 1 from the danger of bulging in the area of the junction point.

Figure 8:
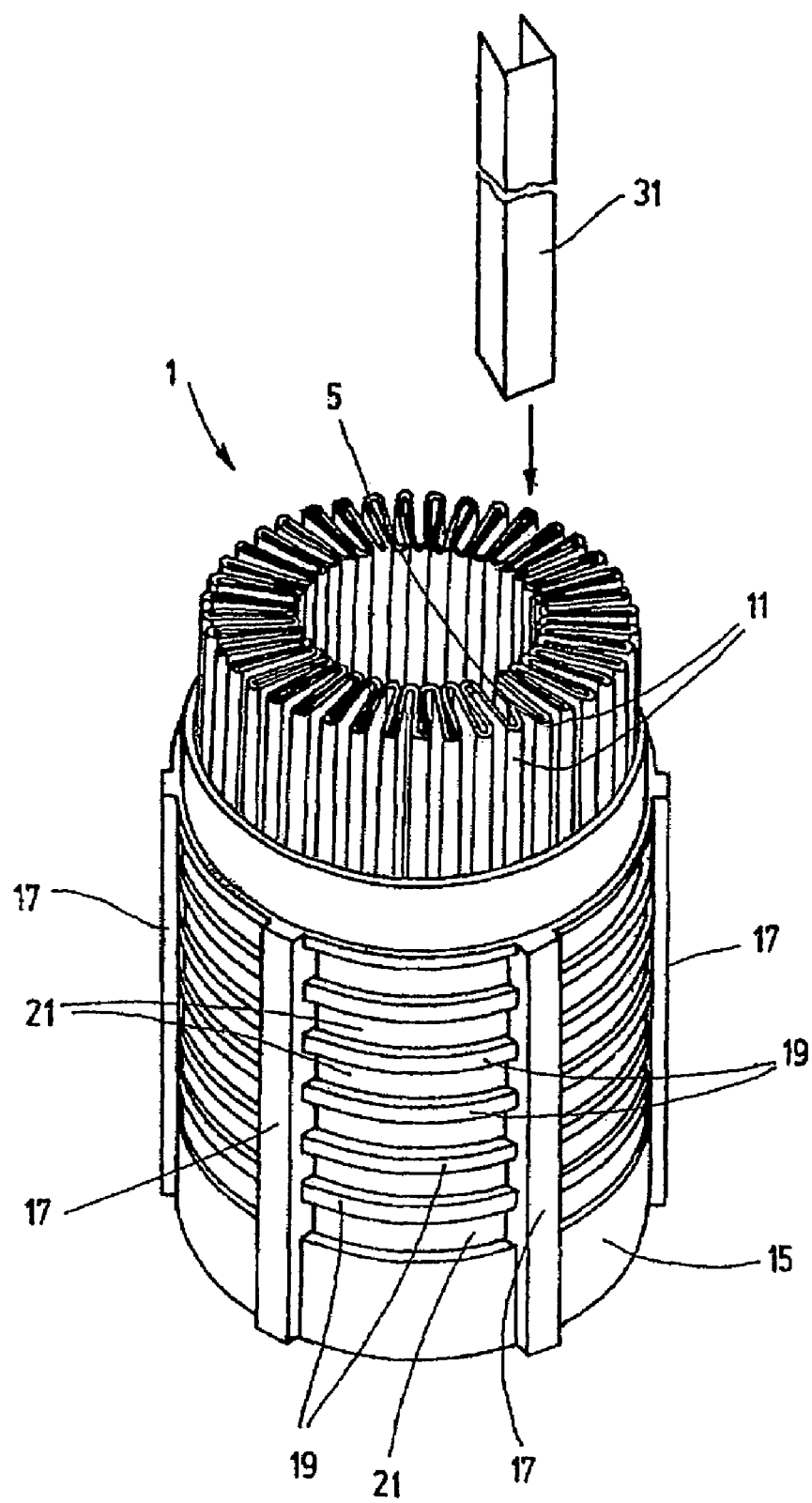

FIG. 8 shows a third exemplary embodiment of the present invention having a support tube 15 without interior retaining projections 23 and 25. For enclosure of the area of the junction point, that is, the fusion seam 5, in this exemplary embodiment a retaining device is provided having a metal clamping element 31. Clamping element 31 is U-shaped in cross-section, and may be positioned by insertion on the outer sides of the fold facing away from the fusion seam 5. The retaining action essentially corresponds to that of the retaining projections 23 and 25 of the preceding exemplary embodiment.

In addition, in the example shown in FIG. 8, the annular element 1 has been reversed to assume the state shown in FIG. 2, so that the fusion seam 5 is positioned in the interior and the tops of the folds adjoining this seam are supported directly by the support tube 15. Consequently, this exemplary embodiment is protected in two ways from bulging in the area of the fusion seam 5.

While various embodiments have been chosen to illustrate the invention, it will be understood by those skilled in the art that various changes and modifications can be made therein without departing from the scope of the invention as defined in the appended claims.

What is claimed is:

1. A filter element, comprising:
a filter cylinder having a filter mat web arranged in a series of folds adjacent to one another at least in individual areas thereof, each of said folds having two radial members extending radially inwardly and connected by a crown on radial outward fold ends, said filter mat web having two web ends extending a height of said filter mat web and connected to one another at a junction point forming said filter mat web into an annular element, two of said folds being adjacent to said junction point and on opposite sides thereof;
a fluid permeable support tube surrounding said filter cylinder; and
a retaining device with retaining elements overlapping said two of said folds on outer surfaces of said radial members thereof remote from said junction point;
whereby, when fluid to be filtered flows through said filter element from an interior thereof to an exterior thereof, said retaining device resists bulging of said two of said folds and separation of said web ends of said filter mat web.

2. A filter element according to claim 1 wherein
said ends of said filter mat web are joined along end edges facing interiorly of said annular element; and
said crowns of two of said folds face said support tube.

3. A filter element according to claim 2 wherein
said filter mat web comprises a flexible mat of metal-free, plastic-supported filter mats.

4. A filter element according to claim 3 wherein
said junction point comprises a fusion seam.

5. A filter element according to claim 4 wherein
said filter mat web has dimensions allowing reversal of said annular element, whereby said fusion seam can be formed on an exterior of said annular element and then be reversed to be located in an interior of said annular element.

6. A filter element according to claim 1 wherein
said retaining elements comprise retaining projections extending radially inwardly from an inner surface of said support tube.

7. A filter element according to claim 6 wherein
said support tube comprises a transfer-molded plastic tube with said retaining projections formed integrally thereon.

8. A filter element according to claim 6 wherein
one of said projections comprises a series of members spaced by interstices and arranged along a length of said support tube.

9. A filter element according to claim 1 wherein
said retaining device comprises a U-shaped clamping element with legs thereof forming said retaining elements and with a bight portion thereof connecting said legs and being adjacent an inner surface of said support tube.

10. A filter element according to claim 5 wherein
said dimensions are determined by the following relationships $$L_M = 2^* F_{Ans} * \left( F_H - 2^* M + \frac{\pi^* M}{2} \right)$$

$$D_{a_{\max}} = D_i + 2^* L_{\max}$$

$$L_{\max} = \frac{D_{a_{\max}} - D_i}{2}$$

$$D_{i2} = \frac{F_{Ans} * F_D}{\pi}$$

$$L_{M_{\max}} = D_{a_{\max}} * \pi$$

$$D_{a_{\max}} = \frac{L_{M_{\max}}}{\pi}$$

$$D_{a_{\max}} = D_i + 2 * L_{\max}$$

$$L_{\max} = \frac{D_{a_{\max}} - D_i}{2}$$

$$L_{\max} = \frac{\frac{L_{M_{\max}}}{\pi} - D_i}{2}$$

$$L_{\max} = \frac{L_{M_{\max}} - F_{Ans} * F_D}{2 * \pi}$$

$$L_{\max} = \frac{F_{Ans} * \left( F_H - 2 * M + \frac{\pi * M}{2} - \frac{F_D}{2} \right)}{\pi}$$

where
$F_{ANZ}$=number of folds in said filter mat web
$F_H$=height of each fold
$F_D$=thickness of each fold
M=strength of material of structure of said filter mat web $L_M$=extended length of said filter mat web
$L_{Mmax}$=maximum extended length of said filter mat web
$D_{amax}$=maximum external diameter of a filter disk formed from said annular element
$D_i$=internal diameter of said filter disk formed from said annular element
$L_{max}$=maximum length of said filter cylinder.

* * * * *